United States Patent [19]

Rexer et al.

[11] 3,986,767
[45] Oct. 19, 1976

[54] OPTICAL FOCUS DEVICE

[75] Inventors: Rudolf J. Rexer, West Springfield, Mass.; James P. Waters, Rockville, Conn.

[73] Assignee: United Technologies Corporation, Hartford, Conn.

[22] Filed: Mar. 1, 1976

[21] Appl. No.: 662,992

Related U.S. Application Data

[63] Continuation of Ser. No. 460,657, April 12, 1974, abandoned.

[52] U.S. Cl. .................... 350/299; 219/121 L; 350/63; 350/289; 350/293
[51] Int. Cl.² ........................................ G02B 5/10
[58] Field of Search ................ 219/121 L, 121 LM; 331/94.5, DIG. 1; 350/63, 289, 293, 299, 310

[56] References Cited
UNITED STATES PATENTS

| | | |
|---|---|---|
| 3,528,424 | 9/1970 | Ayres .................... 331/DIG. 1 X |
| 3,597,578 | 8/1971 | Sullivan et al. .......... 331/DIG. 1 X |
| 3,619,550 | 11/1971 | Matthews .................. 219/121 L |
| 3,696,230 | 10/1972 | Friedrich ................... 350/63 X |
| 3,781,094 | 12/1973 | Griest ........................ 350/310 |

Primary Examiner—Ronald J. Stern
Assistant Examiner—F. L. Evans
Attorney, Agent, or Firm—Anthony J. Criso

[57] ABSTRACT

An apparatus for focusing a beam of collimated radiation at various locations over a wide area is disclosed. The apparatus includes a focus head having an offaxis parabolic section in combination with a flat turning mirror. The head is capable of rotating the beam about two orthogonal axes and is mounted in a gantry which permits three dimensional movement of the entire head.

6 Claims, 2 Drawing Figures

OPTICAL FOCUS DEVICE

This is a continuation of application Ser. No. 460,657, filed Apr. 12, 1974, now abandoned.

BACKGROUND OF THE INVENTION

1. Field of Invention

The present invention relates to optics and more particularly to a focus head for controlling a beam of collimated radiation.

2. Description of the Prior Art

The control of focus and spatial location of radiation such as laser beams containing high power has been found to be very difficult. The prior art includes some apparatus useful in this regard, however, much of the existing equipment has limited function which is inadequate in applications such as materials processing. Almost invariably the prior art apparatus is based on combinations of flat and spherical reflecting surfaces which require that the focusing section be onaxis, a term used herein to describe a mirror oriented to receive incident energy which appears to originate on or close to the line of symmetry for the mirror surface. Spherical mirrors can be heavy but more importantly, they invariably introduce aberrations due to their geometric shape and the manner in which they reflect light. Further, in order to avoid even more severe offaxis aberrations, the axis of the incident radiation and the axis of the reflected radiation form a small included angle and consequently the flat turning mirror has to be positioned at a relatively large separation distance from the spherical mirror in order for the beam to clear itself. Therefore, a focus head based on spherical optics tends to be large and cumbersome because of the large separation distance between the mirrors. Further, the standoff — the distance between the focus head and the work surface — is usually kept as small as possible in order to minimize the size of the system. To facilitate the use of lasers in applications such as commercial material processing on a practical basis, a versatile focus head which can be packaged in a practical structure and is capable of providing good optical control to a beam of laser radiation at a relatively long standoff is required.

SUMMARY OF THE INVENTION

An object of the present invention is to focus a laser beam with reflective optics which are movable with respect to a workpiece.

According to the present invention, reflecting optics are fitted within a manipulable focus head which is freely translatable in a three coordinate system to allow the beam of collimated radiation from a laser to be moved with respect to a workpiece while a desired condition of beam focus is maintained at the workpiece; in a preferred embodiment the reflecting optics allow the beam to be rotated about two orthogonal axes and consist of an offaxis parabolic mirror section having two out of plane adjustments and one in plane adjustment in combination with a flat turning mirror.

A primary advantage of the present invention is the rotation versatility provided with only two reflective surfaces. A laser beam is readily rotatable about two orthogonal axes with the two mirrors thereby tending to minimize weight and reflection losses. In addition, the system operates with no onaxis aberrations.

Main features of the present invention include the diffraction characteristics of the focused beam and the relatively long standoff provided by the parabola. The distance between the focus head and the workpiece is optimized to provide the largest amount of clearance and the smallest focused spot. The focus head is a lightweight construction which is readily serviced and aligned and is comprised entirely of reflective surfaces. Also the primary focus element is protected by a substantial structural enclosure.

The foregoing and other objects, features and advantages of the present invention will become more apparent in the light of the following detailed description of a preferred embodiment thereof as illustrated in the accompanying drawing.

DESCRIPTION OF PREFERRED EMBODIMENTS

Figure 1:
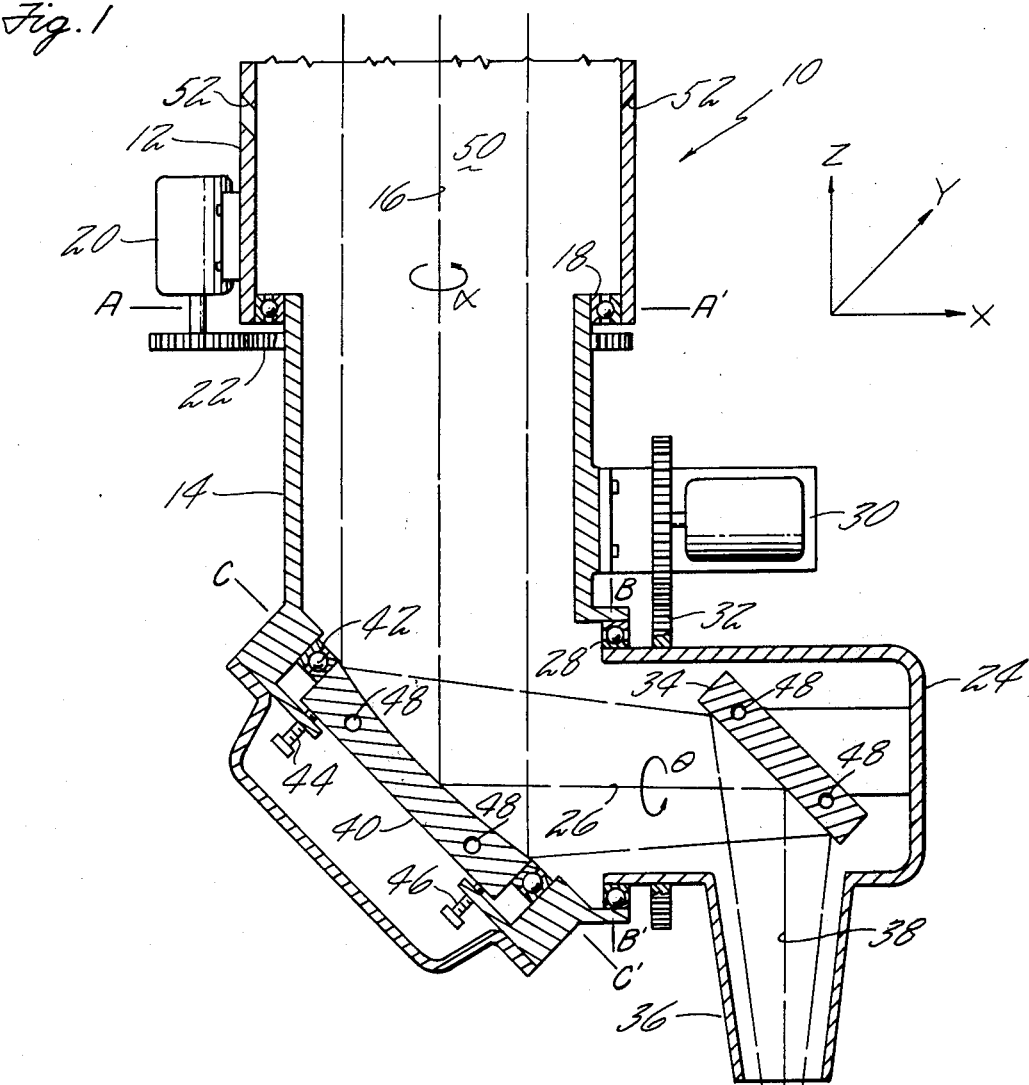
FIG. 1 is a simplified section of a focus head in accordance with the present invention.

A manipulable focus head 10 in accordance with the present invention is shown in FIG. 1 in a vertical orientation. An upper housing 12 which is a fixed reference with respect to the remaining components forming the focus head and a lower housing 14 are positioned about an input axis 16, extending in the Z direction. The housings are rotatable with respect to each other through an angle alpha about a horizontal bearing 18 which lies in the plane AA'. An alpha drive motor 20 fixedly attached to the upper housing, engages an alpha ring gear 22, fixedly attached to the lower housing. Similarly, a side housing 24 positioned about an intermediate axis 26 extending in the X direction is rotatable through an angle theta about a vertical bearing 28 which lies in the plane BB'. A theta drive motor 30 fixedly attached to the lower housing, engages a theta gear ring 32 fixedly attached to the side housing. The side housing encloses a turning mirror 34 and has a conical section 36 through which an output axis 38 passes extending the Z direction. Internal to the lower housing is a focus mirror 40 which is rotatable on a mirror bearing 42 in the plane CC'; a first 44 and a second 46 mirror adjustor engage the focus mirror. Both the focus and turning mirrors have coolant passages 48.

During use of the focus head, an input beam 50 of collimated radiation is directed into the head along the input axis 16. The focus mirror which is preferably a 90° offaxis parabolic section causes the beam to converge and redirects the beam along the intermediate axis. The surface of the turning mirror is flat and is oriented to form a 45° angle with the intermediate axis. The turning mirror changes the direction of propagation of the converging beam 90° and the beam converges to a focus spot 54 located on the output axis.

The reflecting surfaces which accomplish the focusing and redirecting functions are essential to the present invention. The focus mirror 40 and the turning mirror 34 have reflecting surfaces which are described as a 90° offaxis parabola and an optical flat respectively. As is readily apparent from FIG. 1, these two mirrors in combination readily accommodate the rotation of the input beam about either of two orthogonal axes. The focus head is shown with the parabolic surface in the lower housing and the optical flat in the side housing and while the location of these surfaces can be reversed, the indicated sequence is preferred. In an embodiment in which the input beam initially contacts the optical flat, a critical alignment must be maintained between the flat and parabolic sections. In order to avoid having the parabolic section introduce unacceptable aberrations into the system, the angular deviation of the beam incident thereon must not exceed plus or minus a tenth of a degree with respect to the axis of the parabolic section; translational alignment is not critical. The critical alignment can be accomplished by providing two out of plane rotation adjustments to the optical flat and complete alignment of the system requires three additional adjustments on the parabolic section as is discussed in more detail hereinafter. Another practical consideration to inverting the order of the surfaces is that the focusing element acquires a line of sight relationship with the work surface thereby assuming a higher probability of contamination or physical damage as the focused beam interacts with the work surface.

The particular design of the focus head shown in FIG. 1 permits easy servicing of either of the reflective surfaces. The focusing and turning as described herein are necessarily accomplished with reflective surfaces because of the power level of the laser beam. More particularly, the mirrors are metal since these materials have a high thermal conductivity and can be readily cooled by flowing a fluid such as water through the cooling passages internal to the mirrors. Another valuable aspect of the design is the protection affordable to the reflective flat. As is discussed above, the parabolic mirror is protected from splatter and foreign matter originating at the focus spot as a result of positioning within the focus head. The turning mirror of necessity is in line of sight communication with the focus spot, however, the conical section which extends from the side housing reduces the contamination exposure of the mirror. In addition, provision is made for injecting a gas such as dry air into the focus head through a plurality of inlet ports 52, flowing the gas through the head and out the end of the conical section thereby tending to blow away contaminants which might otherwise be a concern. The gas flow also provides additional cooling to the mirror surfaces.

The term offaxis mirror as used herein describes the relationship between a reflective surface and a source of radiation; an offaxis mirror describes a configuration in which the radiation striking a section of the reflection surface originates parallel to but spaced apart from the symmetry axis of the parent surface. By way of contrast, an onaxis configuration is one in which the radiation incident upon a lens or reflective surface originates on or close to the axis of symmetry describing the surface. Further, a 90° parabolic mirror as used herein describes a reflective section from a paraboloid, the parent parabola, wherein a line through the center of the section makes an angle of 90° with the axis of symmetry of the parent parabola, the angle being measured at the intersection of a line drawn from the center of the section in question, through the focus point of the parent.

In order to provide the versatility of rotation of the laser beam about two orthogonal axes with the simplest apparatus, a 90° offaxis parabolic section is absolutely essential; no other offaxis section is adequate. In addition to rotatability, this combination permits a maximum standoff and minimum focal spot size as is discussed further below. Alternative combinations of reflecting surfaces require at least one additional mirror, or the further complication of simultaneously rotating the flat turning mirror about the Z axis whenever the curved focusing surface is rotated. If the collimated incident beam and the focused reflected beam are not orthogonal, rotation of the focusing surface causes a change with respect to both beams and at least one additional mirror is necessary to compensate for the effect of the rotation in one of the beams. Therefore, a primary advantage of being able to provide a flexible focusing system which can be rotated over wide ranges of interest with only two reflective surfaces is readily apparent. The minimization of the number of mirrors involved results in the additional advantages of reducing the size and weight of the overall focus head and minimizing the losses which inevitably occur at each reflective surface regardless of the quality of the surfaces. Reflective losses can be as high as five percent, an amount which may be critical in a laser system having limited output power.

An aberration is a geometric optics consideration, one form of which can be described as the result of a collimated bundle of rays which does not cross a single point in the focal plane of the focusing element; alternatively, an aberration can be considered the result of producing a wavefront which is not entirely spherical. Parabolic mirrors form a special class with respect to aberrations introduced into collimated rays since the presence of a bundle of rays parallel to the axis of symmetry of a parabolic section always results in all of the reflected rays passing through the focus point of the parent parabolic mirror. Since a parabolic section can eliminate all onaxis optical aberrations, a near diffraction limited focusing is achievable with the present invention. The use of curved sections from a sphere, an ellipsoid or a hyperboloid, for example, as the focusing element always results in onaxis optical aberrations when the incident radiation is collimated.

Although the use of a parabolic section is essential to near diffraction limited performance of the present invention it is not sufficient. The input axis of the parabolic section, that is, the straight line which passes through the center of the section parallel to the symmetry axis of the parent parabola must be aligned to within approximately a tenth of a degree with the axis of the beam of incident radiation in order to provide near diffraction limited focusing of infrared radiation such as that typical of a carbon dioxide laser. The axial alignment of the parabolic section is provided in the present invention by the first and second mirror adjustors 44, 46 shown in FIG. 1. Both adjustors are out of plane with respect to the reflecting surface and consist of threaded screws which engage the back of the parabolic section at convenient points which allow the section to be tilted about two mutually perpendicular axes. In addition, the parabolic section has one in plane adjustment which is the mirror bearing 42 making possible by suitable rotation of the parabolic mirror in the plane CC' coincidence of the input axis of the parabolic section with the geometric centerline of the focus head. The rotational adjustment is necessary because of the asymmetry which the offaxis parabolic section displays with respect to the incident beam. Although diffraction limited alignment is possible using only the mirror adjustors 44–46, this alignment alone does not necessarily result in the optical axes being coincident with the geometric axes of the surrounding structure.

Consequently, the out of plane mirror adjustors can be set to satisfy the requirements for diffractively limited focusing and unless the in plane adjustment provided by the mirror bearing is available, the converging beam may impinge upon a structural member inside the head. The parabolic section induces no onaxis aberrations, that is, all the radiation in a collimated beam which is incident upon the mirror and parallel to the axis of symmetry of the parent mirror will pass through the focus without aberration. Thus, translational alignment is not a factor. Alternatively, a bundle of parallel rays which approaches the parabolic section in a direction not parallel to the axis of symmetry is focused at a region other than the focal point of the parent mirror and is highly aberrated.

The spatial alignment requirements of the flat turning mirror with respect to the parabolic section are not critical. For the purposes of the present invention, it is only necessary that the converging beam leaving the parabolic section strike the turning mirror and be directed toward the intended focus point without being intercepted by any surrounding structure. Therefore, the turning mirror is fixedly attached to the side housing during initial fabrication and requires no further adjustment. If the angle of incidence at which the converging beam strikes the turning mirror is other than 45°, due to matching error or incorrect alignment of the parabolic section, the angle of reflection will vary accordingly; however, the system is flexible enough to accommodate such angular deviations over relatively large tolerances of 5° either side of optimum within the limits described. One effect of such misalignment is the angular rotation theta is no longer orthogonal with respect to the input axis although the focus spot size remains unaffected.

When the two reflecting surfaces and the incident laser beam are aligned within the tolerance described, the ray bundle will form a blur circle from zero to 6 mils in diameter, the blur circle being the minimum geometrical size of the focus spot exclusive of diffraction effects. This range in the size of the spot is due to misalignment between the parabolic section and the incoming beam. The actual size of the focal spot is the sum of the diffraction limited focus spot and the blur circle. The diffraction limited spot size $d$ and the focal length $f$ can be described by the relationship, $$d = 2.44 \, \lambda f/D$$

where
- $d$ is the diameter of the diffraction limited spot,
- $\lambda$ is the wavelength of the radiation,
- $f$ is the focal length of the parabolic section, and
- $D$ is the diameter of the incident beam.

Since the diameter of focus spot increases as the distance between the focus and workpiece increases, near diffraction limited operation is essential to an optimum head design; alternatively, standoff is sacrificed for spot size.

The process of folding and focusing a collimated beam which is accomplished when the input beam is reflected by the parabolic section requires a finite amount of space adjacent to the mirror surface before the converging beam is clear of the collimated beam. A similar consideration exists with respect to the subsequent folding of the converging beam by the flat mirror. Thus, if the offaxis section is less than 90°, the spatial location of the focus spot is less than the maximum standoff. This premise suggests the use of an offaxis section greater than 90°, however, these sections are increasingly difficult to fabricate. Further, these sections do not permit rotation of the beam about orthogonal axes and they are extremely sensitive to misalignment with respect to the incoming beam. A typical standoff for many working environments is approximately one foot although the clearance can be considerably less due to the presence of tooling and irregularly shaped working surfaces. The condition of maximum standoff occurs for the special case of a ninety degree offaxis section.

Figure 2:
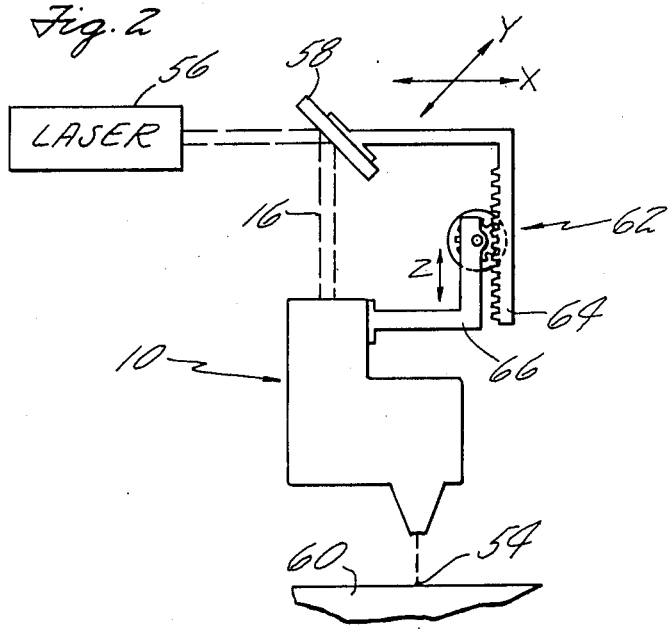
FIG. 2 is a simplified sketch showing the focus head mounted in a three coordinate transfer system.

One of the applications involving the focus head is shown in a very simple sketch in FIG. 2, the purpose of which is to illustrate the versatility and freedom of movement of the invention. A laser source 56 provides the input beam which is directed into the focus head 10 by a gantry mirror 58; the head concentrates the beam at the focus spot on a workpiece 60. A gantry structure 62 comprising an upper support 64 which positions the gantry mirror and is movable in the X or Y directions with respect to the workpiece, and a lower support 66 which positions the focus head and is movable in the Z direction with respect to the upper support, allows the focus head to be repositioned over a wide area on the workpiece.

Although the invention has been shown and described with respect to preferred embodiments thereof, it should be understood by those skilled in the art that the foregoing and various changes and omissions in the form and detail thereof may be made therein without departing from the spirit and the scope of the invention.

Having thus described a typical embodiment of our invention, that which we claim as new and desire to secure by Letters Patent of the United States is:

1. Apparatus for focusing a beam of radiation which is collimated about an input axis comprising:
   an upper housing through which the beam is able to pass freely;
   a lower housing through which the beam is able to pass freely, the lower housing being connected to, and rotatable with respect to, the upper housing;
   a first means for rotating the lower housing with respect to the upper housing about the input axis, the first rotating means being fixedly connected to the upper housing;
   a side housing through which the beam is able to pass freely, the side housing being connected to, and rotatable with respect to, the lower housing;
   a second means for rotating the side housing with respect to the lower housing about a second axis which is orthogonal with the input axis, the second rotating means being fixedly connected to the lower housing;
   an off axis parabolic reflector mounted in the lower housing in a position which intersects with the input axis to focus and redirect the input beam along the second axis;
   means in the lower housing for rotating the parabolic reflector in the plane of the parabolic reflector; and
   a flat reflector mounted in the side housing in a position which intersects with the second axis to redirect the focused beam along an output axis.

2. The invention according to claim 1 wherein the lower housing includes:
   means for adjusting the orientation of the parabolic reflector with respect to the input axis for any set position of rotation.

3. The invention according to claim 2 wherein the parabolic reflector is a 90° off axis parabola.

4. The invention according to claim 3 wherein the side housing includes a conical extension which projects along the output axis.

5. The invention according to claim 4 including further means for internally cooling the parabolic and flat reflectors.

6. The invention according to claim 5 including further means for flowing a dry gas across the reflectors and out the conical extension.

* * * * *

UNITED STATES PATENT OFFICE
CERTIFICATE OF CORRECTION

PATENT NO. : 3,986,767
DATED : October 19, 1976
INVENTOR(S) : RUDOLF J. REXER ET AL It is certified that error appears in the above-identified patent and that said Letters Patent are hereby corrected as shown below:

Column 2, line 43, after the word "extending" insert
-- in --

Signed and Sealed this

Fifteenth Day of February 1977

[SEAL]

Attest:

RUTH C. MASON
Attesting Officer

C. MARSHALL DANN
Commissioner of Patents and Trademarks